Patented Sept. 20, 1932

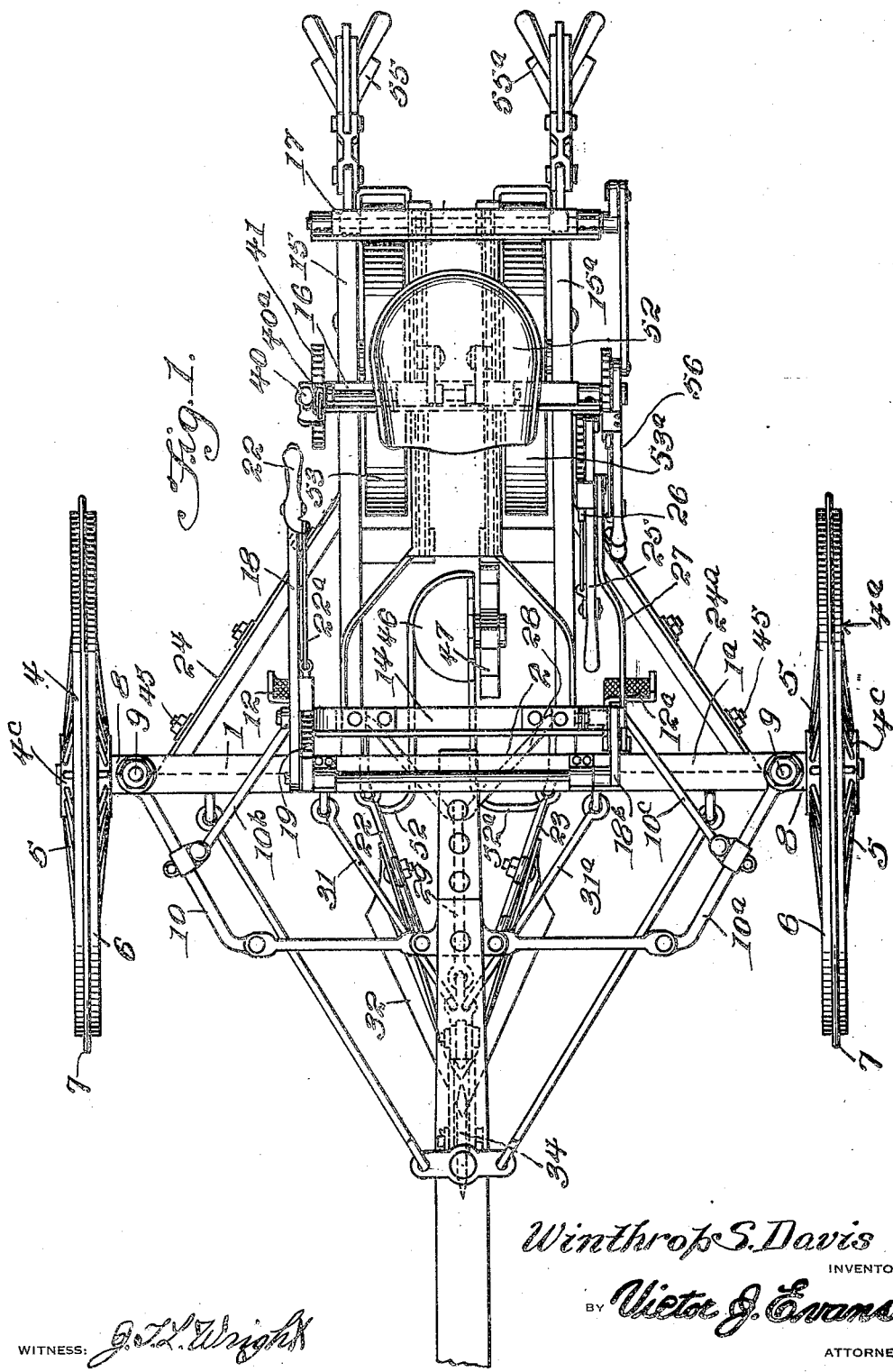

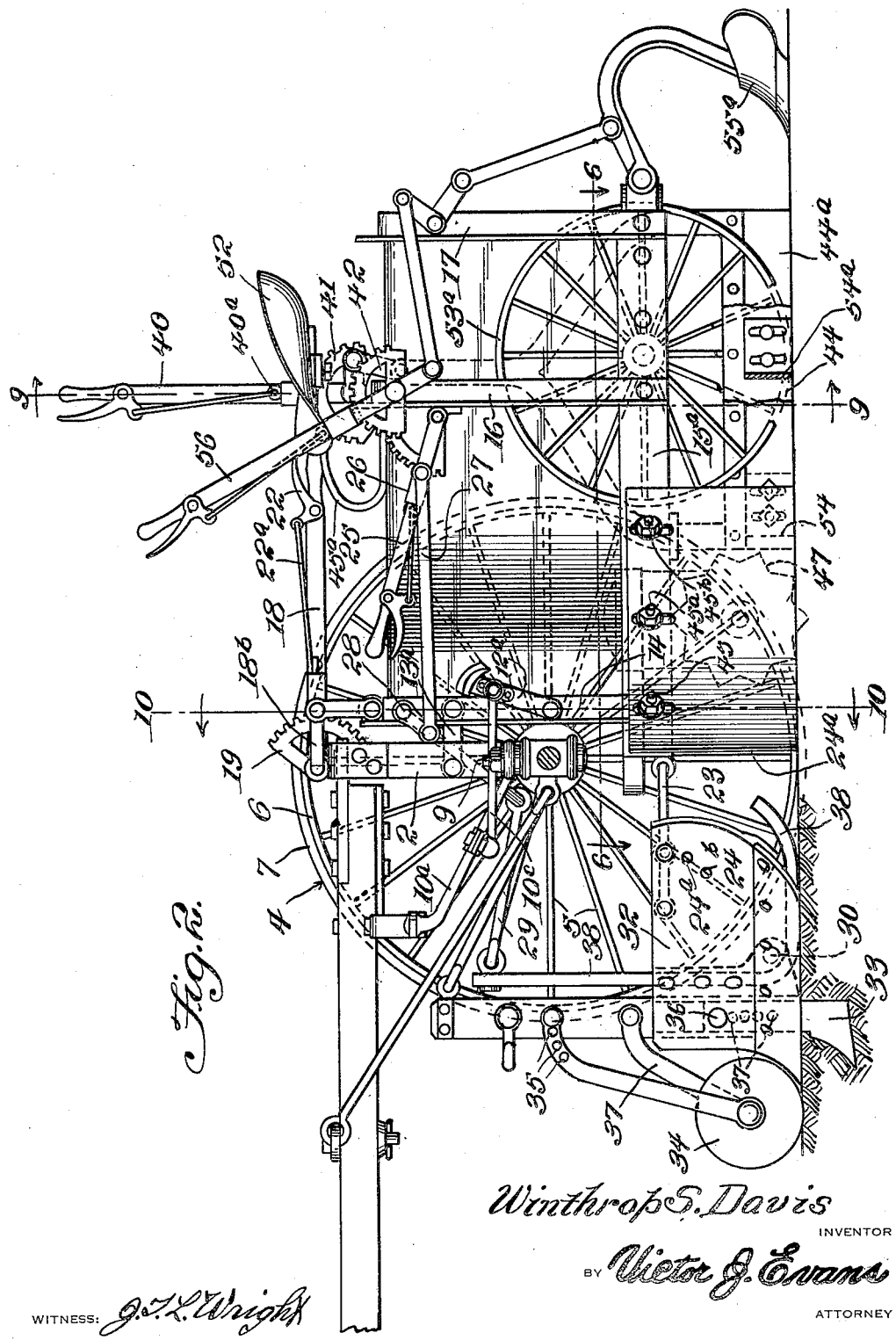

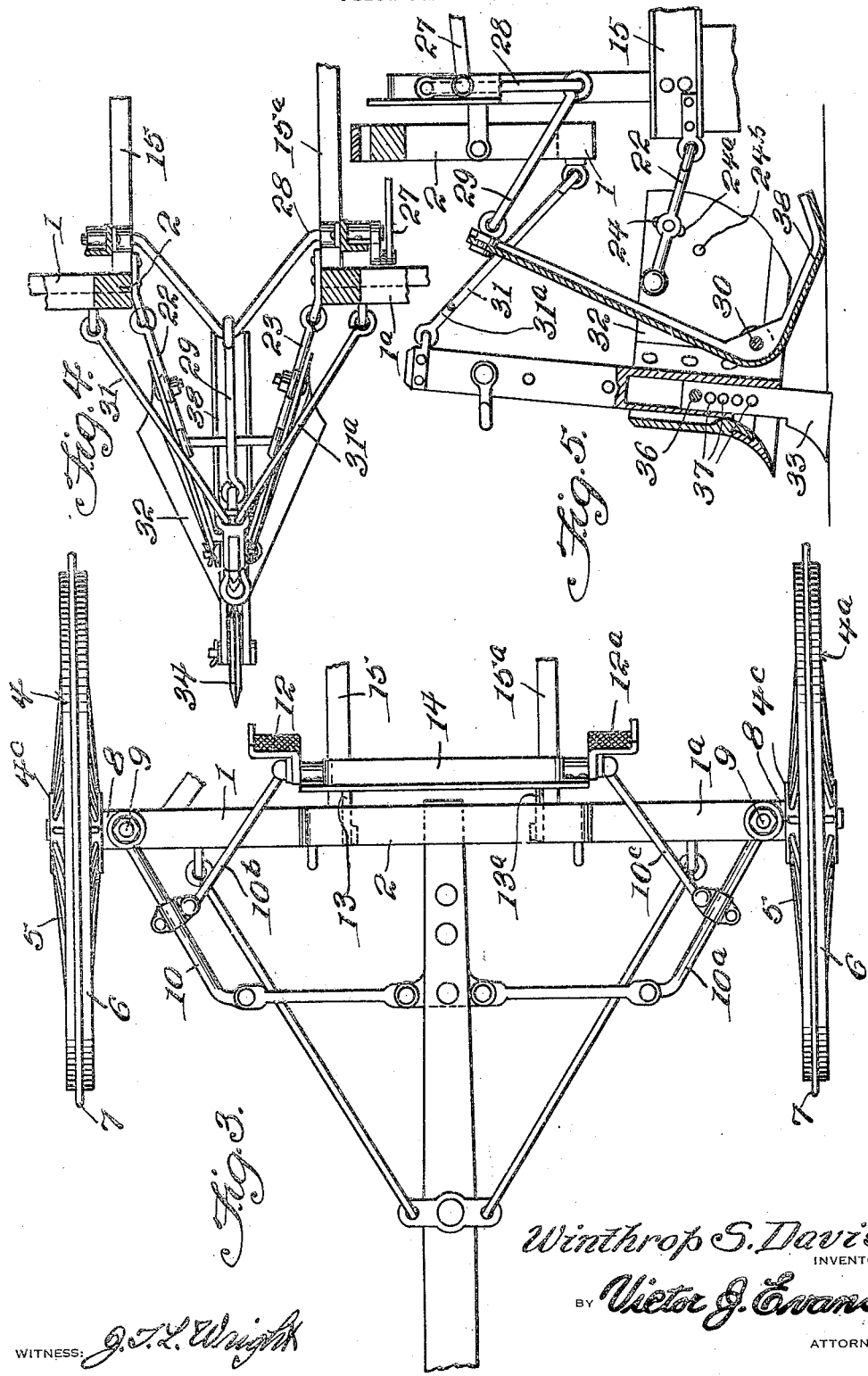

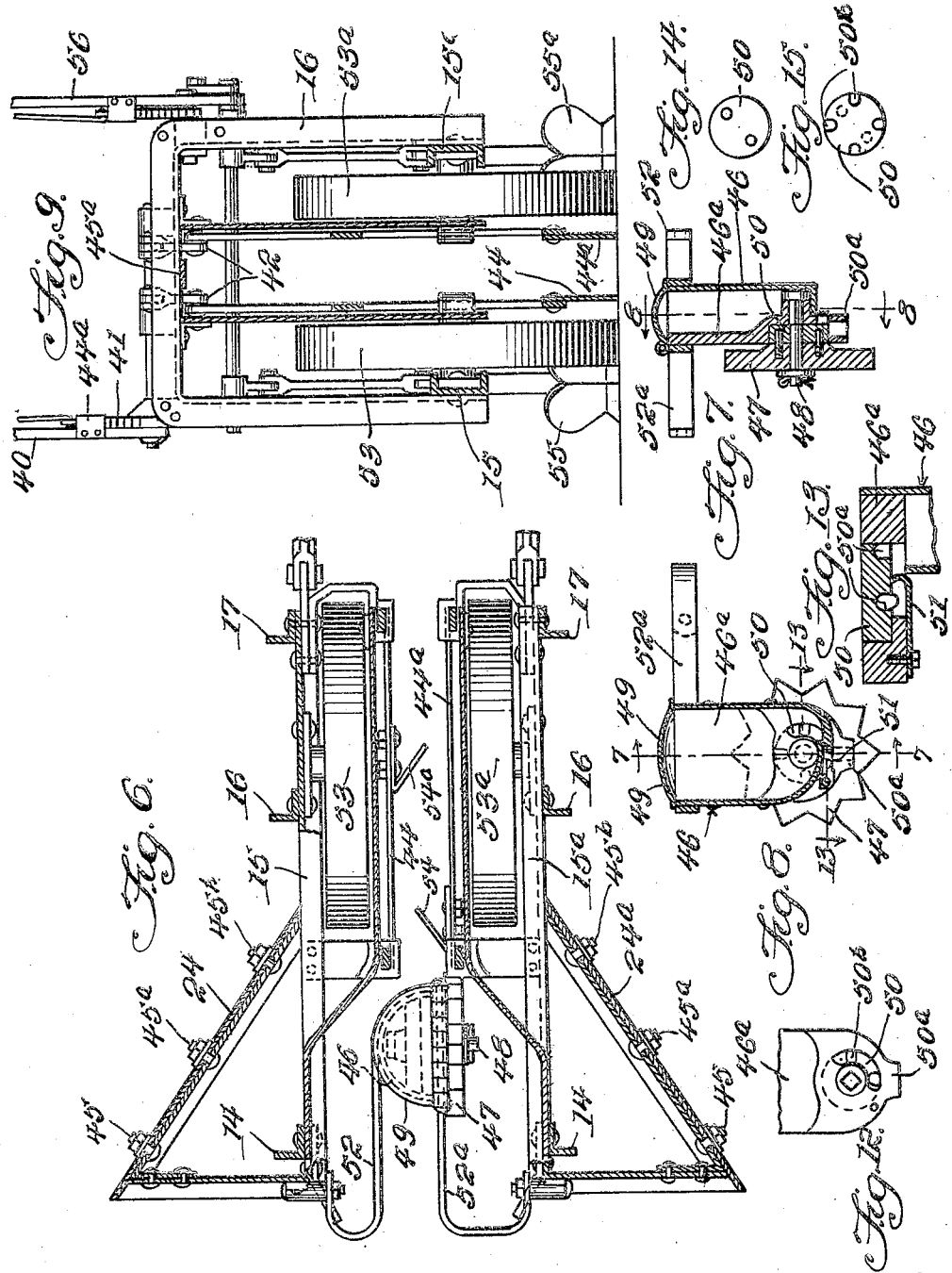

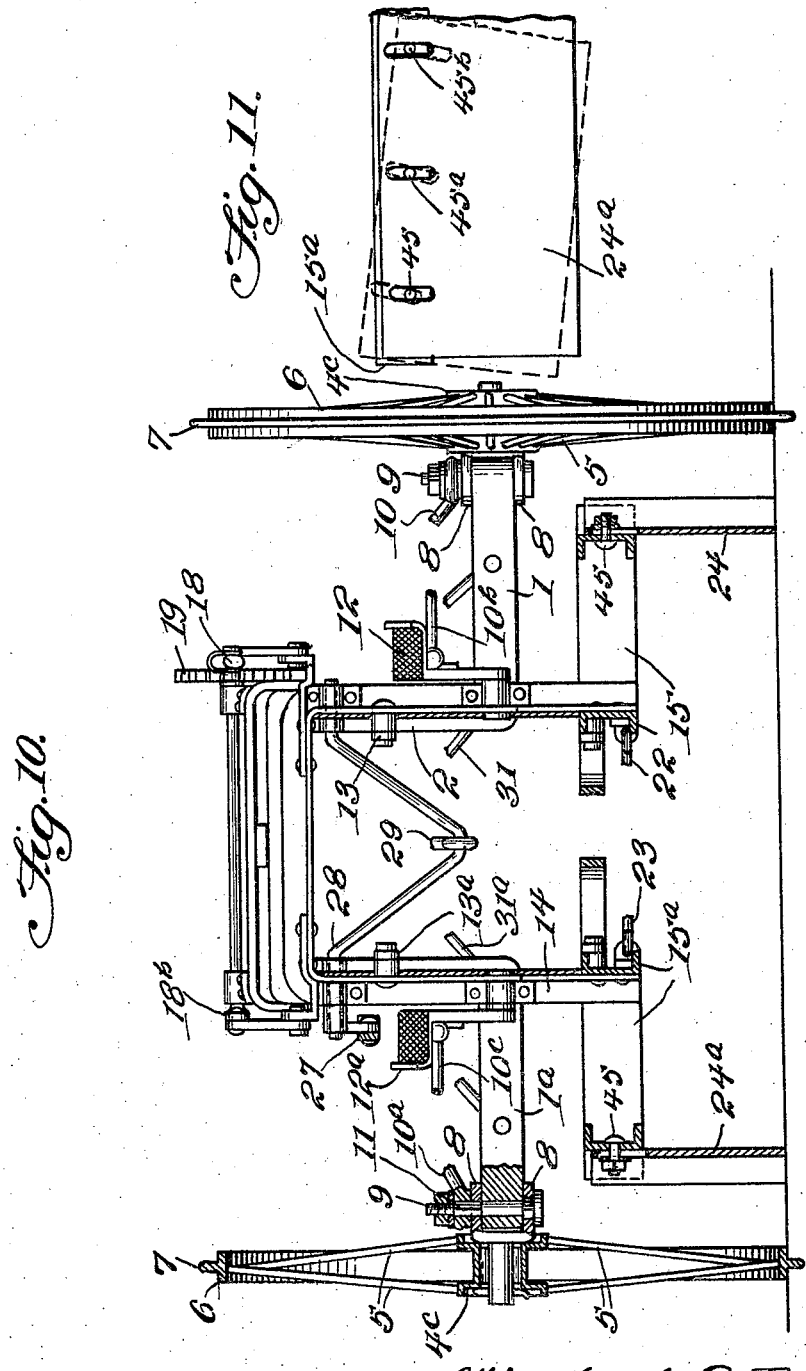

1,878,819

UNITED STATES PATENT OFFICE

WINTHROP S. DAVIS, OF PUEBLO, COLORADO

MEANS FOR PLANTING AND CULTIVATING

Application filed January 21, 1927. Serial No. 162,517.

This invention relates to the art of farming and means for carrying it out by a novel farming machine adapted to afford in a single organized machine a great plurality of agricultural treatments of soil—to sever the undergrowth, cut a furrow in the earth, deposit the seed, deliver a nutriant mulch of weeds to afford a bed pervious to moisture, cover with granular soil, hoe and compact the soil on the deposited seed, and upturn the earth to form a shed to deliver rain to the growing crop, thus assuring the best conditions for retaining and delivering moisture to the growing seed until the crop matures.

My invention, therefore, comprises all of the functions that have been hitherto required by a plurality of agricultural tools and machines, being a furrow opener, planter, mulcher, cultivator, pulverizer, packer, and crop assuring apparatus, in one piece of mechanism. The machine performing these manifold functions may be power-driven or horse-drawn. Its essential features comprise a pair of pivoted traction wheels of special formation, accurately directed by a driver, in which at the front end is a rotary tractive disk to cut down undergrowth or herbage and weeds, with an adjacent furrow opener and subsoil plow axial therewith to loosen the earth beneath the furrow, a soil pulverizer, laterally inclined shearing knives to cut weeds and discharge them at the sides of the furrow to form a nutrient mulch, a planter to deposit the seeds one at a time in the furrow, hoes to distribute the earth and cover the mulch and seed, rolling packers to tamp the earth over the seed planted, and a final pair of plows to upturn the earth at the sides of the crop to form a water-shed to divert moisture to the growing seed. The traction wheels are mounted pivotally on a pair of fixed axles to which are fixed by inclined stays a drawbar or tongue. The front axle has an integral arch the sides of which are shown in Figures 2 and 3 and there is an adjacent arch of angle iron in which rotates the crank shaft, for operating the parts of the mechanism. This arch carries two transversely spaced links to which the rear of the machine is connected. It also forms a support for a lever which controls parts of the cultivating apparatus. There are a plurality of these arched frames, including two on the rear part of the machine for controlling the knives, guards and plows.

My invention, therefore, consists of a novel method of farming carried out by a considerable number of novel structures for effecting the numerous functions noted, the specific nature of which will be hereinafter more fully defined in the appended claims and which will be fully described in the accompanying specification.

I have illustrated the several parts of a machine for carrying out the invention in the accompanying drawings, in which:

Figure 1 is a top plan view.

Figure 2 is a side elevation with the front traction wheel removed.

Figure 3 is a detail view in plan of a draft steering mechanism.

Figure 4 is a top plan of the furrow opener partly in section.

Figure 5 is a side elevation partly in section of the furrow opener and attached parts.

Figure 6 is a section on plane 6—6 (see arrow) of Figure 2.

Figure 7 is a section of the seeder on plane 7—7 of Figure 8.

Figure 8 is a section of the seeder on plane 8—8 of Figure 7.

Figure 9 is a section on plane 9—9 of Figure 2.

Figure 10 is a section on plane 10—10 of Figure 2.

Figure 11 is a detached elevation of the knives and plates to divert weeds.

Figures 12, 13, 14 and 15 are details of the seeder.

Referring now in detail to the drawings, 1, 1a represents the two sides of an axle provided with a central arch 2, (see Figure 10) which is raised above the plane of the axle to provide an open space in the central part of the machine. This axle is preferably formed of an integral length of steel on the ends of which are pivoted spindles for the traction wheels. Many of the parts of the machine are formed of angle iron secured together by bolts to form a rigid structure.

At the ends of the axle are journaled traction wheels 4, 4a, the spokes of which are preferably formed of steel wires 5 locking together as a strong unit the hub 4c and rim 6, the edge of the latter being provided with a median earth penetrating circular spine 7, the face of the rim being chamfered or roughened to assist traction. The hub 4c turns on a spindle or journal having parallel spaced ears 8 perforated to take a bolt 9 to afford a pivotal joint with the axle. These wheels are controllable together for simultaneous movement by pivotal links 10, 10a connected with the drawbar or tongue, having at the wheel square terminal holes (see Figure 10) engaging a square shoulder 11 of the bolt 9, the square shoulder engaging also the ears 8 of the wheel spindle, thus moving the wheels by the pivotal links 10, 10a. Thus the wheels can be directed by the driver placing his right or left foot on the pivoted pedals 12, 12a, and motion is communicated to the wheels to turn to the right or left by rods 10b, 10c, swinging the pivotally connected linkage with the drawbar to vary the angle of the traction wheels. The tongue or drawbar may be stayed by link connections, as shown in the drawings. The wheel control is in some respects similar to that of an automobile, but differs therefrom in essential specific features.

The furrow opener is constructed on the plan of a "Go devil" or so that it rolls the earth from the center to each side and leaves the walls in a sloping condition from the center of the row to the edges. It may be set to open at any desired depth of furrow and is regulated by raising and lowering a lever or hitch 25 controlled by a latch 26. The lever is pivoted to a fixed point at the side of the arch 16 and carries a rod 27 operating a crank 28 to raise and lower the upper end of the attachments constituting the weed cutter and furrow opener; the bowed crank arm 28 being operated by the lever 25 (see Figures 1 and 2) and a link 29 connects with the pulverizer 38 so that on operating the lever 25 the link 29 tilts the bottom angular leg of the pulverizer, turning on a fixed pivot 30 on the furrow opener 32 and subsoiler (see Figure 5); thus it will be seen that by raising the hitch by the handle 25 the pulverizer is depressed and raises the subsoiler in the furrow. The furrow opener and the subsoiler are relatively adjustable (see Figure 5); the latter may be adjusted vertically in the recessed end of a bar by a bolt 36 engaging any of a row of bolt holes 37. The furrow opener 32 has a removable flaring share which may be removed for sharpening. The top of the furrow opener is held in position by means of two iron bars 31, 31a, one extending to the left axle and the other to the right axle, as indicated in Figure 4. The lower end of the furrow opener is secured to the machine by means of two heavy diverging irons (see Figure 1 at 22, 23) forming a link connection with fixed eyes on the pair of bars 15, 15a to vary the depth of the furrow (see Figures 1 and 2). Its rear end is provided with a plurality of bolt holes 24, 24a, 24b by which its plow end may be thrown upward to different angles so as to cut a varying depth of furrow when the lever 25 is operated. It will be apparent that with a sharp conical concave surface it will open a furrow of V-shape which will not throw out the dirt as does a lister or plow. Bolted to the furrow opener is the subsoiler 33, the relative position of which to the furrow opener may be adjusted by a plurality of bolt holes. The cutter 34 is placed in advance of the furrow opener and its position may be regulated by a plurality of bolt holes 35 to adjust the cutting depth thereof as the cutter is swung on a companion arm 37 bolted to the subsoiler 33 on which the furrow opener is mounted. The subsoiler extends into the bottom of the V-shaped trench formed by the furrow opener. This device is formed of steel and drawn to a point so as to readily penetrate the ground. It not only loosens the earth several inches below the furrow, but steadies the furrow opener so that it will maintain a straight course. The sides of the furrow opener are slightly concave, similar to a road grader, its bottom being equipped with a share on each side, which are 6 inches wide and concave, supported as shown in Figure 5, the device thus being removable for the purpose of repairs and sharpening.

In the rear of the furrow opener is mounted an earth pulverizer 38 pivoted to the furrow opener by the bolt 30 and connected at its upper end by the link 29 controlled by the adjusting lever 25 which controls the furrow opener. This pulverizer serves two purposes, one being to raise and lower the furrow opener from engagement with the furrow, and the other serves a function in pulverizing the earth thrown up by the subsoiler so that an ideal seed bed is prepared. It is believed this feature of my invention is a decided improvement over the lister, for it handles less earth, leaves the sides of the furrow sloping so that water will naturally run to the center where the seed is deposited and will soak readily into the subsoil, thus leaving the center between the rows dry so that weeds will not grow there and especially as the inclined knives, presently to be described, cut the weeds and throw them to the furrow to form a mulch which conserves all moisture, so that a large proportion of the water falling on the field will drain toward the planted seed, soaking into the subsoil and conserving all moisture for promotion of crop growth. In other words, my machine may be called a self-irrigating method of farming, as all weeds, herbage, etc., are cut and directed toward the furrow in which the seed is deposited, forming a mulch which eventually rots, and acts as a fertilizer as well as a spacer to keep the soil pervious and absorptive of moisture, thus accentuating fertility.

The draft end of the machine and the rear and are connected by two laterally displaced links 13, 13a connecting the arch 2 and the axle and an adjacent closely related arch of angle iron 14 bolted at the bottom to side rails 15, 15a. At the rear end of the machine are placed a short distance apart two other arches 16, 17 bolted to the side rails 15, 15a on which are mounted regulating levers. The lever 18 engages a fixed rack sector 19 and turns a transverse shaft pivoted in brackets on top of the arched axles. This member has a latch and links 22, 22a for engaging the rack teeth. The end of the shaft carries a crank 18b by which the adjacent arch formed of angle iron may be raised and lowered to vary the vertical position of the side rails 15, 15a, on the diverging ends of which are mounted the knives 24, 24a, thus there is an adjustment by which the position of these knives may be varied with reference to the ground surface.

40 is a lever for controlling the position of the guards at the sides of the furrow. It has a latch 40a cooperating with the fixed sector 41 and may be graduated to various vertical depths by a pivoted link as 42 pivotally connected with the bars 43, 43a to raise and lower the guards 44, 44a relatively to the ground. 24, 24a represent vertical diverging knives supported by a plurality of adjustable bolts 45, cooperating with vertical slots in a sheet metal extension of the side bars set in diverging angles in the side bars 15, 15a, thus being vertically adjustable. Under traction the edges of these knives shear the weeds and divert them toward the furrow and the pulverized soil mingles with the weeds and herbage to form a mulch adjacent to the furrow. 46 (see Figures 7 to 15) is the planter trailing after the furrow opener comprising a star wheel tractor 47 pivoted by a pivotal bolt 48 through the walls of a hopper 46a with a pivotal cover 49 acting as a reservoir for seeds to be sown. The hopper is provided with sloping bottom walls delivering the seed by rotation of the traction wheel. Fixed to the face of the wheel by a pair of pins (see Figures 7 to 13) is a steel disk provided with a peripheral series of seed pockets, four in number, as shown in the drawings, each pocket of a size to easily nest a single seed of some particular kind. The star wheel in movement picks up a seed from the hopper by a pocket and carries it in the closely adjacent walls of the hopper to the spout 50a and delivers it by gravity to the furrow. The mouth of the spout is guarded by a flexible delicate spring 51 secured by a set screw positioned so as to permit access to the seed pockets. The said disk is secured to the traction star wheel and will pick up the seed one at a time, and as the seeder tracks along the furrow will deposit seeds in gradual succession, depositing them one at a time. Different disks are grooved with a plurality of peripheral pockets to accommodate seeds of corn, beans, wheat, oats, barley, alfalfa, etc., according to the crop desired. The planter or seeder is secured to the machine by two bail hinges formed in side strips 52, 52a and when raised from the ground is out of gear, but when the drive wheel and furrow opener are lowered into operation the planter is brought into contact with the furrow and by tracking along its axis delivers a consecutive series of seeds. As the star wheel turns under traction of its radial prongs each groove in the seed disk carries a seed over the side walls of the tapering hopper without possibility of injury from abrasion on account of the delicate leaf spring at the bottom of the mouth which adjusts itself to the size of the seeds, and delivers it to the outlet at the bottom. A pair of guards 44, 44a are adjacent a pair of packing wheels 53, 53a to pack down the dirt, mulch and other débris thrown centrally by the inclined knives and packed down by the transit of the heavy wide-faced packing wheels. In using the machine as a planter one of these wheels is transferred to the space between the guards where it tamps the furrow over the planted seed. The guards are movable relatively to the packing wheels and are adjustable by the control lever 40 at the right hand of the driver's seat. By moving the lever both ends of the guards may be shifted to any depth into the furrow and by moving them back the guards are raised up to any desired height to permit turning movement of the machine. These guards are set 6 inches apart and may be raised and lowered at will to permit the soil to fall on either side. A desirable feature of my invention is in this flexibility by which any kind of crop may be planted at a definite depth. Nothing but fine soil broken up by the pulverizer falls beneath these guards, the clods, weeds, etc., being diverted to the outside and the hoes 54, 54a in tandem on opposite sides distribute the fine earth (Figures 2 and 6), thus affording the best possible type of seed bed. These are inside of the guards on the opposite sides and are adjustable up and down, the purpose of which is to roll the fine soil which falls beneath the guard to that side of the center of the row between the guards. They are spaced a desired distance apart and roll the soil to the center, and thereby cover the seed to a given depth. The guards have another purpose; for instance, if we have a crop of beans to cultivate that are only 5 or 6 inches high and are infested with small weeds ½ inch high, by setting the guards 2 inches from the ground and allowing 2 inches in depth of soil to roll in at either side, these weeds will be covered to a depth of 2 inches, and thereby smothered so that they will cause no more damage and prove innoxious to the growth, but in fact will afford protection by forming a mulch which will nourish both by decay and by porosity of soil introduced; thus is gained an important end from a point of fertilization and is a great improvement on all other types of planters and cultivators with which I am familiar. It will be seen that any amount of soil may be brought in at the side of the crop. These little pieces of steel which divert the granulated material to the furrow are in fact hoeing devices for, as it will be readily apparent, they clear the trench of every weed by burying it and smothering it. My machine is arched to a height of 30 inches and outside and over the guards it is housed with heavy galvanized sheet steel to the top of the arch. It is placed in the machine for the purpose of protecting crops while cultivating, causing them to slip through the machine without damage to the stalks or foliage; the housing is secured to the frame by bolts. The housing is fastened at the top and bottom by bolts to the frame, and is closed on top except for a short opening along the front of the machine to permit the driver to watch the crop as he guides the machine along a row.

At the rear of the machine is a pair of shovels 55, 55a, 4 inches wide, which upturn the earth just outside the mulch on each side of the furrow, throwing up the earth at the sides of the row and forming a water-shed to divert rain and irrigate the growing crop, leaving the ground in a sloping condition on each side of a row, and by its irregular conformation forming a recess in time of rain to be gradually absorbed by the mulch and drained by capillary action through the same to the seed. These shovels or plows are simultaneously controlled by a lever 56 similar in construction to those already described and are pivoted on the arch 16 and may be raised or lowered to graduate the depth of soil upturned. 52 is the driver's seat supported on a stout leaf spring 45a.

It will thus be seen that I have provided a machine which I believe to be the only one in existence which does a perfect job of surface cultivating when planting, and the only one that digs out every weed when cultivating and leaves the ground in a smooth condition, free from humps. Moreover, it is alone in type in putting weeds to a beneficial use by commingling them with the soil to form a mulch beneficial to the crop. It will be seen, moreover, that the machine is unusual in the respect that it opens its furrow, plants any kind of a crop in rows, cultivates the same until they are mature, provides a mulch to nourish the seed, packs them sufficiently so that they are not blown about, thus affording multiple functions of a group of farming implements which have heretofore uniformly been separately operated. A machine of this construction is comparatively small in weight, being in the neighborhood of 500 lbs., and may be operated easily with four small horses in planting or two horses in cultivating. When cultivating the furrow opener and planter are taken off, which of course renders the machine lighter. The width of the machine is practically the same as ordinary cultivators and is designed in different sizes and widths to meet farming demands. By removing the furrow opener, planter, subsoiler and cutter, the machine is converted into a cultivator which can be successfully used in any kind of row crops until they are 30 inches high. When used for planting corn, beans, milo-maize, cane, fodder grain, the guards are removed, the dirt and mulch thus being directed centrally over the seed, the depth of the planting being regulated by raising and lowering the knives, thus governing the amount of soil brought over the seeds. It will be evident that the machine described does the work of a number of farming machines in one or more operations, thereby reducing cost of equipment and consuming less time, as the farmer in present practice must have a team and driver on furrow opener and planter, another on the cultivator, and another on the packer and pulverizer. I therefore cut down this work and equipment to one third.

I wish it to be understood that while I have shown a type of apparatus well adapted to carry on a great variety of farming functions, modifications of the apparatus I have described may be made without departing from the spirit of my invention and are within the scope of my appended claims.

Having thus described my invention, what I claim as new and desire to secure by Letters Patent is:

1. A device of the character set forth including a frame and supporting wheels therefor, a furrow opener pivoted to said frame, a sub-soiler associated with the furrow opener and extending above and below thereof and having the upper end pivotally connected to the frame, a substantially L-shaped pulverizer pivoted to said furrow opener in rear of the sub-soiler and including an operating arm portion and a ground engaging portion, an operating means carried by said frame and connected to the arm portion of the pulverizer to raise and lower the furrow opener and sub-soiler by moving the sub-soiler on its pivot to regulate the depth of the furrow and trench formed by the furrow opener and sub-soiler, and a combined seed planter and covering means carried by the frame to deliver and cover seed in the furrow.

2. A device of the character set forth including an axle having supporting wheels and a frame carried thereby and extending rearwardly therefrom, spaced tamping wheels journaled to said frame, converging and adjustably mounted knives on said frame to sever weeds from between rows of plants and place them in the path of the tamping wheels to be mashed thereby, and cultivating shovels carried by the rear of said frame to deliver soil to each side of the row of plants and to cover the weeds.

3. In an agricultural machine, a furrow opener, a subsoiler in the center of the furrow opener, a pulverizer at the rear of the subsoiler to form a seed bed, scrapers on the rear and at opposite sides of the furrow opener to carry a portion of the earth and weeds at the opposite sides of the furrow opener, a seed dropper mounted upon the machine to deposit seeds in the seed bed, adjustable means at the rear of the seed dropper to permit of the entrance of a predetermined amount of earth for covering the seeds, means carried by the latter mentioned means to smooth and pulverize the earth over the seeds, means at the rear and on each side of the seed dropper to pack the earth and weeds at the opposite sides of the furrow and means to form a furrow on opposite sides of the seed bed for protecting the latter from excessive water.

4. In an agricultural machine, a furrow opener, a subsoiler in the center of the furrow opener, a pulverizer at the rear of the subsoiler to form a seedbed, adjustable scrapers on the rear and at opposite sides of the furrow opener to carry a portion of the earth and weeds at opposite sides of the furrow opener, a seed dropper mounted upon the machine to deposit seeds in the seedbed, adjustable means at the rear of the seed dropper to permit of the entrance of a predetermined amount of earth for covering the seeds, means carried by the latter mentioned means to smooth and pulverize the earth over the seeds, wheels at the rear and on each side of the seed dropper to pack the earth and weeds at opposite sides of the furrow, and means to form a furrow on opposite sides of the seed bed for protecting the latter from excessive water.

5. In an agricultural machine, a furrow opener, means for effecting a vertical and tilting adjustment of the furrow opener, a subsoiler in the center of the furrow opener, a pulverizer at the rear of the subsoiler to form a seed bed, scrapers on the rear and at opposite sides of the furrow opener to carry a portion of the earth and weeds at the opposite sides of the furrow opener, a seed dropper mounted upon the machine to deposit seeds in the seed bed, adjustable means at the rear of the seed dropper to permit of the entrance of a predetermined amount of earth for covering the seeds, means carried by the latter mentioned means to smooth and pulverize the earth over the seeds, means at the rear and on each side of the seed dropper to pack the earth and weeds at the opposite sides of the furrow and means to form a furrow on opposite sides of the seed bed for protecting the latter from excessive water.

In testimony whereof I affix my signature.

WINTHROP S. DAVIS.